Dec. 21, 1954      F. A. KROHM      2,697,419
FLUID OPERATED WINDSHIELD WIPER MOTOR
Filed Nov. 10, 1949      6 Sheets-Sheet 1
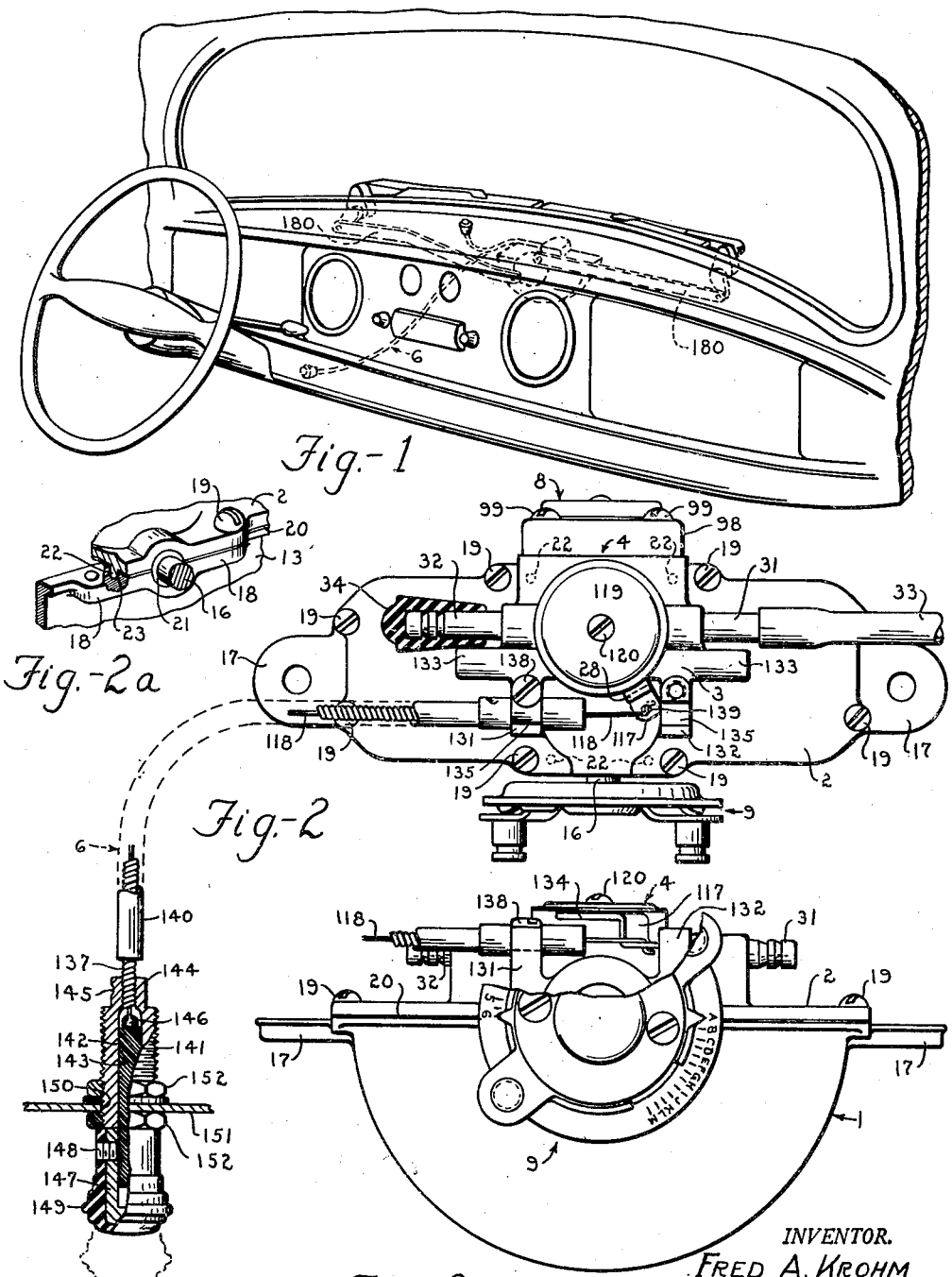
INVENTOR.
FRED A. KROHM
BY
Charles S. Penfold
ATTORNEY Dec. 21, 1954  F. A. KROHM  2,697,419
FLUID OPERATED WINDSHIELD WIPER MOTOR
Filed Nov. 10, 1949  6 Sheets-Sheet 2
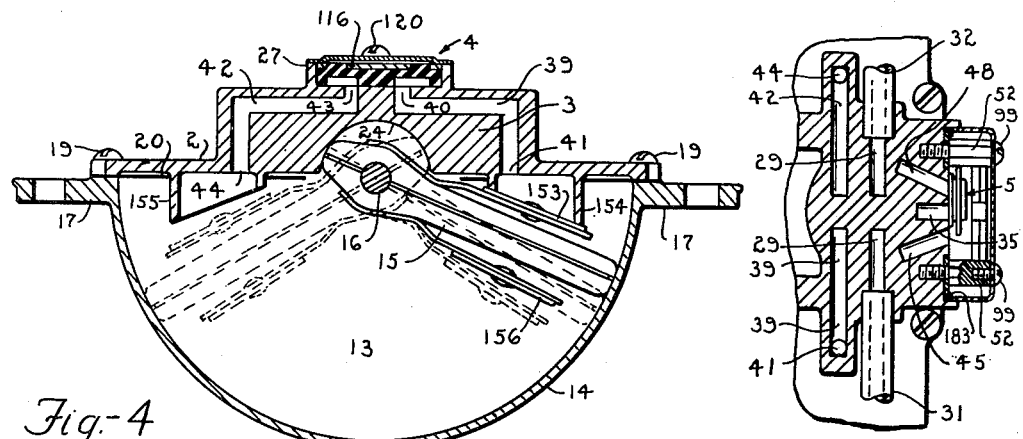
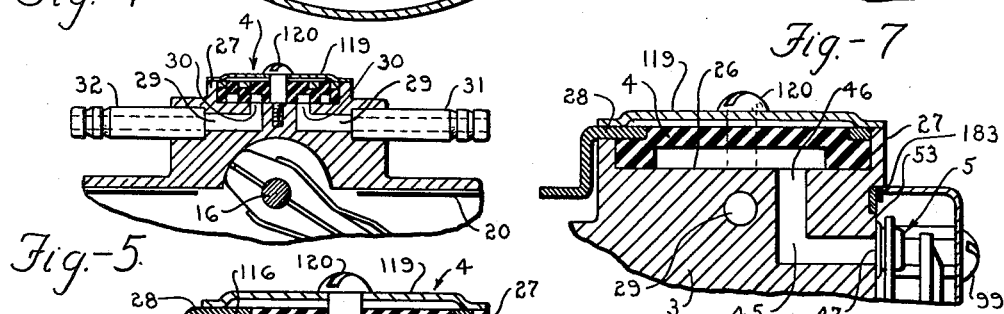
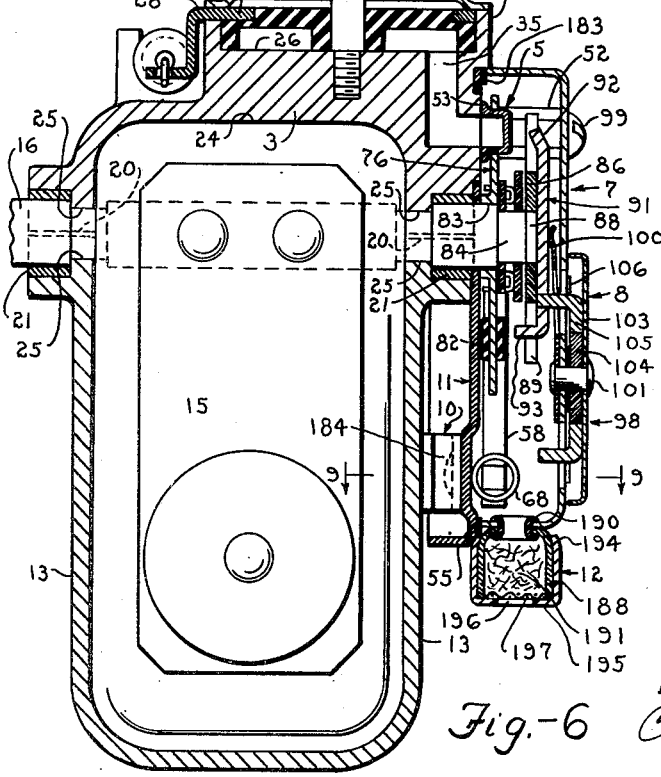
INVENTOR.
FRED A KROHM
BY Charles S. Penfield
ATTORNEY Dec. 21, 1954   F. A. KROHM   2,697,419
FLUID OPERATED WINDSHIELD WIPER MOTOR
Filed Nov. 10, 1949   6 Sheets-Sheet 3
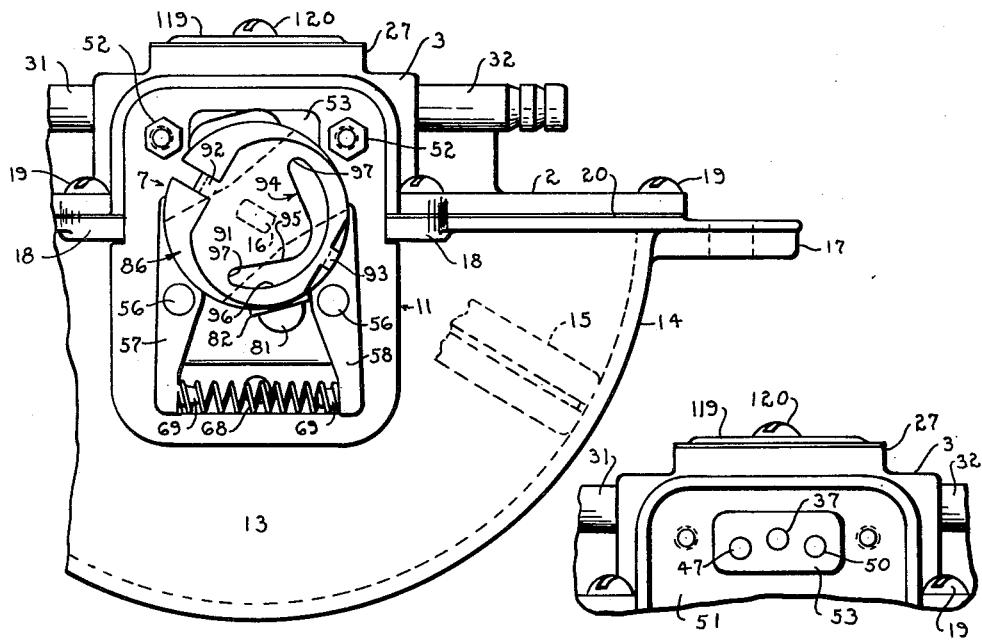
Fig.-10
Fig.-13
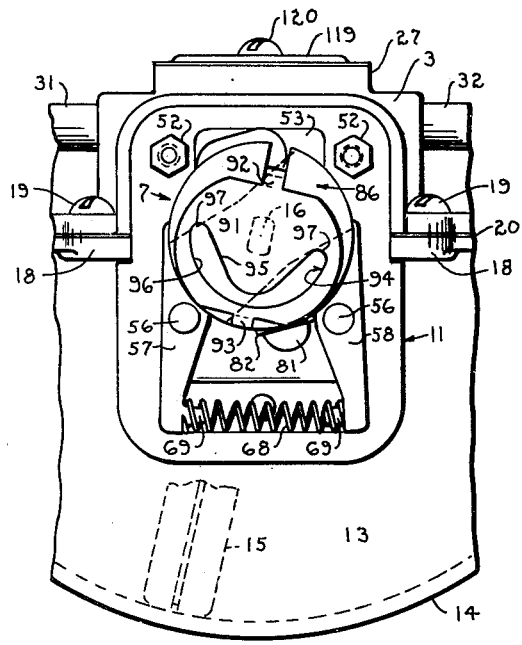
Fig.-11
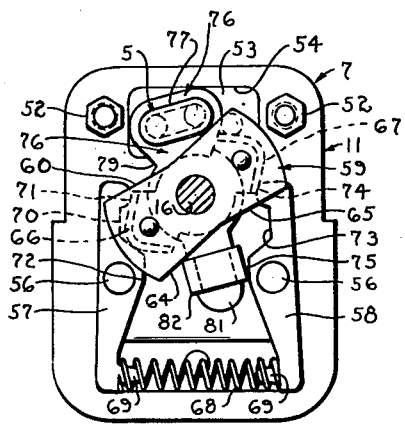
Fig.-12
INVENTOR.
FRED A. KROHM
BY Charles S. Penfold
ATTORNEY Dec. 21, 1954　　　　　F. A. KROHM　　　　2,697,419
FLUID OPERATED WINDSHIELD WIPER MOTOR
Filed Nov. 10, 1949　　　　　　　　　　　6 Sheets-Sheet 4

INVENTOR.
FRED A. KROHM
BY Charles S. Penfold
ATTORNEY

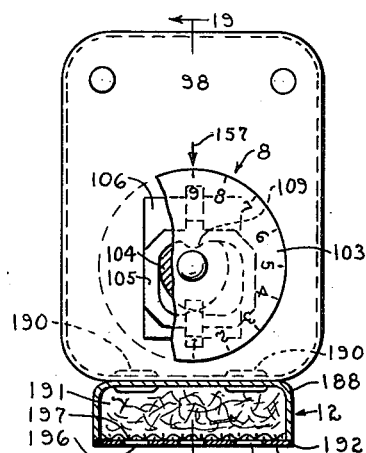

Dec. 21, 1954     F. A. KROHM     2,697,419
FLUID OPERATED WINDSHIELD WIPER MOTOR

Filed Nov. 10, 1949     6 Sheets-Sheet 6

INVENTOR.
FRED A. KROHM
BY Charles S. Penfold
ATTORNEY

United States Patent Office

2,697,419
Patented Dec. 21, 1954

2,697,419

FLUID OPERATED WINDSHIELD WIPER MOTOR

Fred A. Krohm, Gary, Ind., assignor to Productive Inventions, Inc., a corporation of Indiana Application November 10, 1949, Serial No. 126,613

10 Claims. (Cl. 121—97)

This invention is directed to improvements in windshield wiper motors.

Practically every motor vehicle included in the more than 40,000,000 now in service is equipped with a power unit or motor employed to drive a windshield wiper.

These motors develop disabling disorders, from wear and other causes, and must be replaced—millions of them every year. By far the smaller part of the number of motors are electrically driven. The balance, probably more than 30,000,000 in all, are driven by vacuum.

Probably more than 99% of all the vacuum motors in service today, either as original equipment or as later replacements, have been produced by a single manufacturer. Practically all vacuum wiper motor replacements up to the date of the filing of this application have had to be exact replicas of the motor used for original equipment.

Due to varying engineering requirements of vehicle manufacturers such original equipment vacuum motors have varied in power, in dimensions and in other important characteristics including the positions, with relation to each other and to the motor, of the crank pins employed to drive, largely through conventional types of linkage assemblies, the two arms and blades (right and left) used on nearly all windshields.

Due to these and other variations in construction of original equipment motors it would be necessary today for a retail service station making vacuum motor replacements in kind to carrying in stock many more than 100 different vacuum windshield wiper motors of a common make, not one of which is recommended or normally usable in substitution for any other one of the group.

As a result wholesalers and retailers of replacement vacuum motors attempting to give broad service are required to carry heavy investments in motor inventory occupying much space and requiring much attention in ordering for inventory replacements. Between the wholesaler and the retailer, inventory deficiencies occasion serious delays in making needed motor replacements and thus delay effecting desirable reduction in driving hazards.

Because of difficulty in maintaining complete inventories of replacement vacuum motors for full service range, retailers, perhaps in more instances than otherwise, after ascertaining customer-car-owner's need for a vacuum motor, are required to make a special trip to a wholesaler, perhaps in another town, to get the particular motor. The wholesaler in his turn is often required to procure the motor from a distant "master" or "central" warehouse—all of which occasions delay and requires time-consuming effort and excessive expense, often exceeding in cost the value of the motor itself and perhaps seldom leaving any compensation for the reseller.

As emphasizing particularly the purpose and utility of the subject invention, a very large number of separate, special and different crank arms have heretofore been recommended for the retailer to carry for the purpose of completing the manufacture, by the dealer, of vacuum motors to adapt them to desired installations. Even with these many different crank levers the service retailer encounters a very large percentage of motor vehicles to which none of the crank levers in his stock will accommodate the motor.

The novel construction and arrangement of parts and assemblies constituting the subject invention make it possible for a manufacturer of this invention to produce, in four models only, universal motors readily adaptable in replacement installations, as to crank-pin positions and crank-pin (and blade-and-arm) travel, to accommodate approximately 95% of all vacuum-motor-equipped vehicles now licensed to operate in the United States of America, with the exception of some 1949 models of vehicles which do not employ the conventional linkage drive.

The subject invention not only avoids the necessity for keeping available in resellers' stocks large assortments of different crank levers but it also minimizes the need for replacing worn linkages to prevent the blade from slapping against the windshield frame, thus effecting a substantial further saving in time and money for the car owner, and avoiding, as is frequently necessary, expenditures of time and money in obtaining from a distant reseller the particular linkage required for the installation.

The commercial replacement windshield wiper motor now about to be made and sold in large volume, by the licensee under the subject invention, includes a provision for adjustment in the length of the operating arc of the windshield wiper blade to accommodate that arc conveniently to many linkage disorders and other abnormal conditions encountered, and to various standards of wiping arcs effective for different makes and models of vehicles.

The arc-control device which forms a part of the combination above mentioned has high utility in that, by a single manual adjustment, it enables the operator to reduce the arc of travel of the windshield wiper blade to prevent the blade from slapping the frame of the windshield in ordinary operation. This slapping occurs primarily because of wear in the bearings and/or gears of the linkage assembly which transmits the power of the motor to the windshield wiper arm and blade. Such slapping not only causes undesirable annoyance and nerve strain of the driver but it also tends to mar the finish of the automobile and to pound the windshield wiper blade and arm into distortions which interfere with their effective performance. This arc-control device is operatively associated with the valving mechanism of the subject motor and is preferably disposed adjacent one end of the motor shaft.

Thus a primary object of the invention is to overcome the disadvantages above referred to by providing a single motor that will serve (without either removing or adding special parts, adapters and/or attachments) as a replacement for any one of many different models or original equipment motors. More particularly, an object is to provide a motor, with an improved crank device which is readily connectable with linkage assemblies of different designs without removing or adding special parts, adapters and/or attachments, as a replacement for any one of many different models of original equipment motors.

An important object of the invention is to associate the above-mentioned control device in a universal type windshield wiper motor whereby to permit maximum realization of the novel advantages of each said device and to permit maximum universality in adaptation to replacement installations.

An object of the invention is to provide a unique crank device in which the crank pins may be adjusted with respect to each other. More specifically in this respect the crank device preferably includes a supporting member permanently anchored for rotation with the motor shaft, a locking member connected to the supporting member, and a pair of substantially corresponding crank arms carrying the crank pins, the arms having portions preferably disposed between the supporting member and locking member in such a manner that the arms may be rotatably adjusted to any position desired and then locked in place.

Another object of the invention is to provide adjustable means for controlling the distance of travel of the crank pins above referred to, thereby controlling the distance of travel of the windshield wiper arm and blade.

A significant object of the invention is to provide a method of adapting a fluid driven replacement windshield wiper motor, without physical alterations in the internal moving parts thereof, to varying performance requirements of different makes and models of motor vehicles having, respectively, different constructions and arrangements of operatively connected windshield wiper arms and blades of shafts for the actuation thereof, and having, respectively, different constructions and arrangements of linkages or other operative connections between said motor and said shafts, whereby a wiper blade impelled by said motor is parked adjacent whichever of the two extremes of its normal stroke may correspond to the original equipment practice peculiar to that particular make and model of motor vehicle.

A further object of the invention is to provide a throttling method and mechanism constructed and arranged so that, without alteration of such construction and arrangement, movement of the throttle from its median position in either direction will produce reversely a substantially identical performance of the driving vane of the motor.

Another object of the invention is to provide a drive member for engagement with the motor shaft, said member having lugs projecting through a guide plate and constructed and arranged to contact and urge forward inner portions of the internal cam member so that the over-all degree of arcuate movement of the windshield wiper arm may be varied to suit varying requirements of different motor vehicles. By this unique method and structure, a still further obstruction to universality of design and application of replacement windshield wiper motors of the vacuum type is substantially eliminated. It will be noted that the drive member may be shifted and adjusted by a manual control element preferably operating in conjunction with an eccentric.

Differences in the length of original equipment crank arms or levers are accommodated in the subject invention by controlling the length of the arc through which crank pins carried by the crank arms or levers normally travel, thus controlling the length of the arc through which the blade travels on the windshield.

Variations in either of two different characteristics of crank levers used in connection with linkages make different motors necessary to accommodate motor replacement in kind. One characteristic is a difference in arcuate positions of the crank pins with relation to each other. The other varying characteristic is a difference in the distance at which the crank pins are disposed from the axial line of the motor shaft. As will be described more in detail subsequently, provision is made to accommodate differences in arcuate positions of the crank pins by a novel and readily adjustable device which is preferably located adjacent the opposite end of the motor drive shaft.

Another object of the invention is to provide a mounting plate or member for a number of the components comprising a means for actuating a secondary valve mechanism of the motor, with means yieldably bearing against the mounting plate whereby to assist in maintaining the plate in a predetermined position in order that a cover for the actuating mechanism will be maintained in sealing relationship with the mounting plate.

Another object of the invention is to provide a novel arrangement whereby a flexible control for the primary valve of the motor may be connected to the latter in one of a plurality of positions, including improved means for manipulating the control.

A further object of the invention is to provide a novel filter for filtering the air admitted into the chamber or raceway of the motor, including a novel arrangement for securing the filter in operative position.

Other objects and advantages of the invention will become apparent after the description hereinafter set forth is considered in conjunction with the drawings annexed hereto.

Referring to the drawings, wherein like parts are designated by the same numerals:

Figure 1 is a diagrammatic view of an instrument panel assembly of an automotive vehicle exemplifying a motor installed therein;

Figure 2 is a top view of the motor including a flexible hand control unit for operating the motor;

Figure 2a is a partial section showing means for locating the cover on the motor housing;

Figure 3 is a side view in elevation of the motor illustrated in Figure 2;

Figure 4 is a longitudinal section taken through the motor showing the relationship of certain passageways and positions of an oscillating vane carried by the motor shaft;

Figure 5 is a partial longitudinal section taken substantially on line 5—5 of Figure 2 exemplifying details of construction;

Figure 6 is an enlarged vertical section taken substantially on line 6—6 of Figure 2 depicting, among other things, details of a secondary valve actuating mechanism; means whereby the rotational range of the motor shaft may be varied as desired; an improved air filter assembly; and means for maintaining a mounting plate supporting secondary valve actuating mechanism in a predetermined position;

Figure 7 is a partial transverse section taken through an appropriate part of the primary valve body for the purpose of illustrating the relationship of certain passageways;

Figure 8 is an enlarged vertical section taken through an appropriate part of the motor to show additional details of construction;

Figure 9 is an enlarged transverse section taken substantially on line 9—9 of Figure 6 showing the means employed for maintaining the afore-mentioned mounting plate in a predetermined position;

Figures 14, 15:
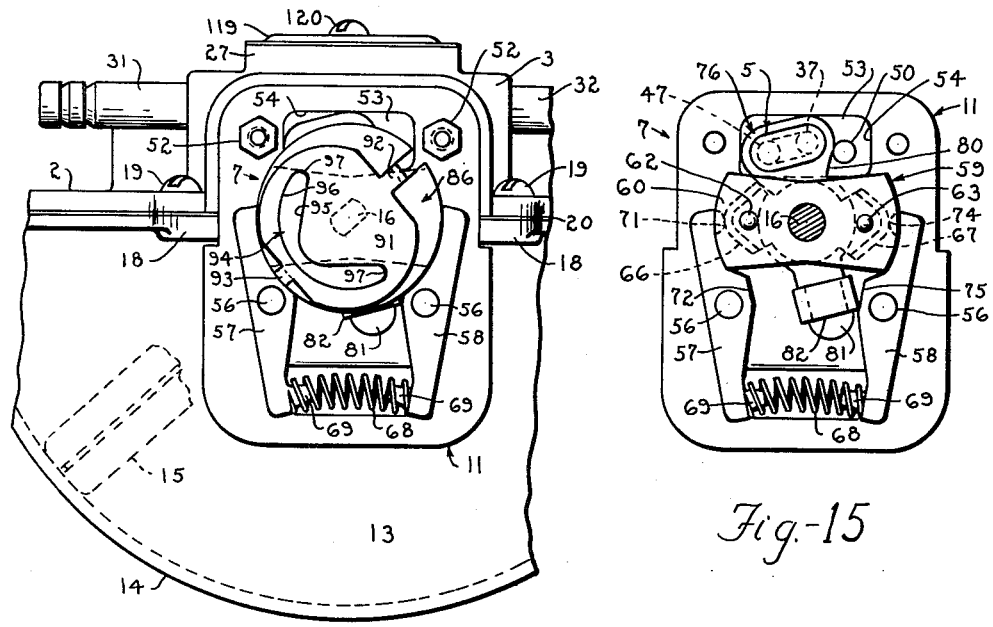
Figure 16:
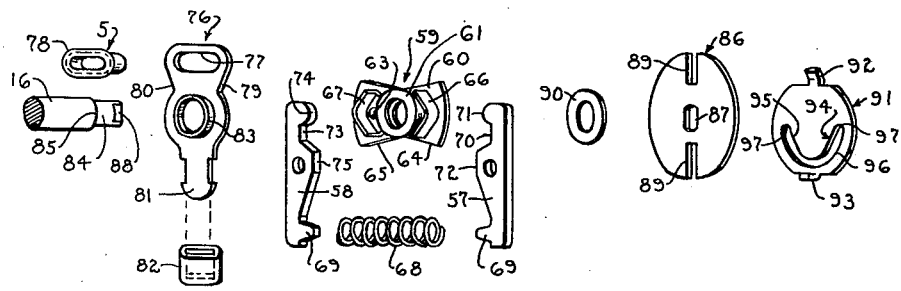
Figure 17:
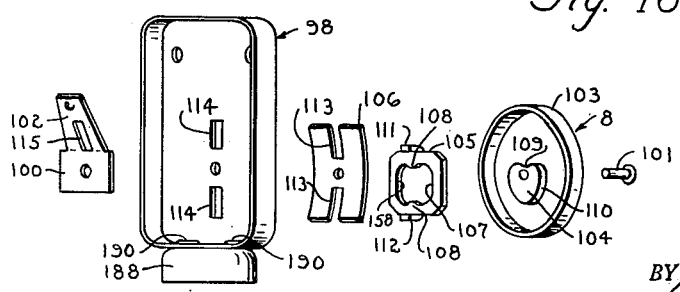
Figure 29:
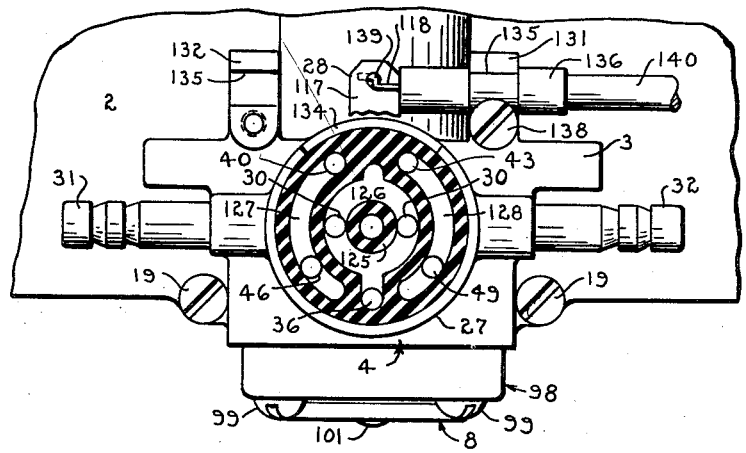
Figure 30:
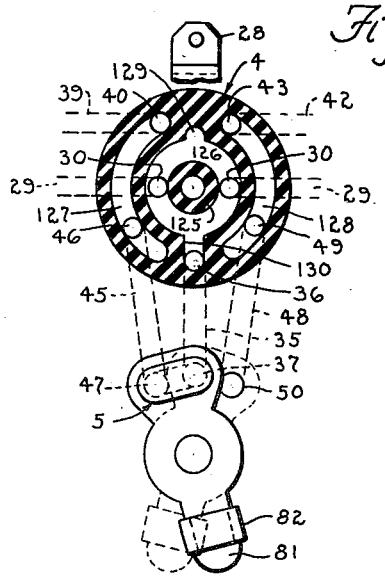
Figure 31:
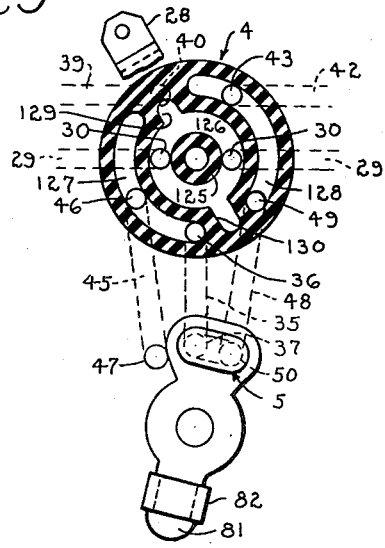
Figure 32:
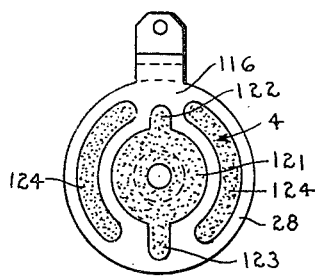

Figures 10, 11 and 12 exemplify side views of the secondary valve actuating mechanism;

Figure 13 is a side view of a part of the primary valve body formed integrally with the cover and showing the relationship of certain passageways;

Figures 14 and 15 are views similar to Figures 10, 11 and 12 depicting various positions of components of the secondary valve actuating mechanism;

Figure 16 is an exploded view showing various components of the secondary valve actuating mechanism;

Figure 17 is an exploded view of parts of the dial assembly operatively connected with the valve actuating mechanism for controlling the rotational range movement of the motor shaft;

Figure 18 is a front view of the dial assembly, including a filter carried by a cover part thereof;

Figure 19 is a vertical section taken through a part of the assembly shown in Figure 18;

Figure 20 is a view similar to Figure 18 and exemplifies a different operating position of a component thereof;

Figures 21 through 24 illustrate the maximum and minimum setting positions of the manual dial control for predetermining the desired rotational range of the motor shaft;

Figure 25 illustrates a front view of a novel crank assembly which is operatively connected with the means employed for controlling the rotational range of the motor shaft;

Figure 26 is a transverse section taken substantially on line 26—26 of Figure 25;

Figure 27 is a view similar to Figure 25, including means for detachably holding the links or arms of a linkage assembly to crank pins provided on the crank assembly;

Figure 28 is a view illustrating one of the components of the holding means shown in Figure 27;

Figure 29 is a top view of a part of the motor illustrating a position of the primary valve which will cause the motor to operate at its maximum capacity;

Figure 30 is a diagrammatic view illustrating the operative relationship of the primary and secondary valves with respect to the vacuum supply, various passages and interior of the motor chamber;

Figure 31 is a view similar to Figure 30 showing the manner in which parking of a wiper arm may be accomplished; and Figure 32 depicts details with respect to connecting the primary valve and its operating lever.

This application is a continuation-in-part of my co-pending applications, Serial Nos. 83,896, filed March 28, 1949; 92,634, filed May 11, 1949; and 100,445, filed June 21, 1949.

The motor structure exemplified in the drawings includes, among other things, a housing 1, a cover 2 provided with a body 3 having passageways therein communicating with a vacuum supply and the chamber of the housing, primary and secondary valves 4 and 5 which control the flow of fluid through the passageways, a flexible hand control unit 6 for operating the primary valve 4, actuating mechanism 7 for the secondary valve, a manually operated dialing device 8 for controlling the range of oscillating movement of the motor shaft including that of a wiper arm adapted to be connected to the shaft, an adjustable crank assembly 9 operatively connected to the dialing device, a resilient support 10 for maintaining a mounting plate 11 carrying the secondary valve actuating mechanism in a predetermined position with respect to a wall of the housing and an improved air filter 12 for cleansing air that is introduced into the chamber of the housing during the operation of the motor.

The housing 1, as shown in Figures 2, 4 and 6, consists of corresponding arcuate spaced apart parallel side walls 13 joined by a substantially semi-circular wall to provide a chamber or a raceway 14 for a vane 15 clamped for rotation with a drive shaft 16. This housing may be constructed as desired but is preferably die-cast and the chamber thereof chromium plated in order to provide smooth and wear resistant contact surfaces for the vane. The housing is preferably flanged outwardly adjacent its marginal edges to some extent for the purpose of reinforcing the edges and at the same time provide a substantial planar bearing surface for the cover 2. Each end of the housing is preferably provided with an integral projection 17 having an opening through which fastening means may be extended for attaching the motor to a vehicle. Each end of the housing has an integral ear provided with a threaded aperture. Each side wall of the housing as shown in Figure 2a of the drawing is provided with a longitudinal reinforcing offset 18 provided with a threaded aperture adjacent each extremity of each offset. The cover is preferably constructed of die-cast material and similarly provided with ears and offsets having holes therein through which screws may be extended for engagement with the threaded apertures in the housing to secure the cover to the housing. The screws 19 are located in predetermined locations in order that their holding action will be well distributed to maintain the opposing planar surfaces of the housing and cover in firm intimate engagement with a gasket 20. The integral offsets on the housing and cover are provided with concave seats receiving tubular bearings 21 which support the drive shaft as shown in Figure 2a.

Each side of the cover, as shown in Figure 2a, is preferably provided with a pair of integral dowel pins 22 which extend through holes in the gasket and are received in holes 23 provided in the offsets 18. These pins serve in the dual capacity of threaded apertures in the housing with the holes in the cover as a preliminary to driving the screws home and as a locating means for the gasket.

The cover 2, as shown in Figure 6, includes, among other things, the valve body 3 and a raised portion which merges with the body and provides a substantially semi-cylindrical chamber or raceway 24 for the upper extremity of the vane. The side walls of the housing and the end walls of this raceway are preferably provided with round clearance notches 25 which embrace reduced portions of the motor shaft as shown in Figure 6.

The valve body 3, as shown in Figures 2, 4, 6 and 29, is provided adjacent its upper side with a circular recess 26 surrounded by an upstanding angular flange 27. This recess including the flange provides a walled seat which rotatably receives the primary throttle valve 4. A valve lever 28 is interlocked with the primary or throttle valve 4 and has an arm to which the inner end of the hand control unit 6 is connected to actuate the valve for controlling the operation of the motor. Parking of the wipers is also accomplished by proper manipulation of this control unit as will be pointed out in more detail subsequently.

The valve body, as shown in Figures 5 and 29, is provided with a plurality of passages which communicate with a vacuum supply, the circular recess 26, the chamber or raceway and the secondary valve. More particularly in this respect, the body is provided with a pair of aligned longitudinal passages 29, which communicate with the recess 26 by vertical passages 30 disposed on opposite sides of the center of the recess. The opposite ends of the longitudinal passages, as shown in Figure 5, are preferably enlarged to receive nipples 31 and 32 in order that a flexible conduit may be connected to either of the nipples in the manner above described. More specifically in this respect, if the installation requires that a conduit 33 extending from the source of suction be connected to nipple 31, the other nipple 32 may be closed by a detachable rubber cap 34 as shown in Figure 2.

As illustrated in Figures 6, 8 and 30, the valve body is provided with an L-shaped vertical passage 35, the upper end of which communicates with the circular recess 26 at a port 36 equally spaced from the vertical passages 30, and its lower end terminates in a center hole 37 provided in a generally rectangular boss formed integral with the body 3. The body as shown in Figure 4 is also provided with a generally Z-shaped passage 39, one end of which communicates with the circular recess 26 at a port 40 and its other end communicates with the chamber or raceway through a port 41, the latter being surrounded by a tubular truncated portion. A passageway 42, similar to and aligned with passageway 39, communicates with the circular recess 26 at port 43 and with the chamber at port 44. As viewed in Figures 7 and 29, it will be noted that the aligned passages 29 are arranged substantially parallel to the longer parts of passages 39 and 42.

The valve body as shown in Figures 8, 29, 30 and 31, is further provided with a passageway 45, one end of which communicates with the circular recess 26 at a port 46, and its other end with an aperture 47 provided in the boss. A passageway 48, similar to passageway 45, communicates with the circular recess 26 at a port 49 and its lower end terminates in an aperture 50 provided in the boss. The hole 37 and apertures 47 and 50 equally spaced therefrom are all operatively related to the secondary valve 5.

The mounting plate 11, as clearly shown in Figures 6, 9, 10, 11, 12 and 13, is preferably rectangular in shape and its upper flat extremity is seated within the confines of a flanged recess 51 formed adjacent one side of the valve body 3 and is secured in the recess by a pair of special screws 52 which extend through holes in the plate and engage threaded apertures in the body. The base or bottom wall of this recess is preferably provided with an integral rectangular boss designated 53 which is the same boss referred to above as having the hole 37 and apertures 47 and 50 therein. The mounting plate is provided with an opening 54 of a size to snugly receive the boss 53. Although not essential, the plane of the base wall of the recess 51 is in the same plane as the edge of one of the longitudinal offsets 18 on the housing so as to provide a stable supporting area for the mounting plate. The boss also serves to accurately locate the plate and at the same time assists in supporting it and thereby removes a part of the load from the screws 52 which would otherwise serve this sole purpose. It will be noted that the lower extremity of the plate is preferably provided with a rearwardly extending border flange 55 and that its upper extremity has an aperture therein which receives the drive shaft 16.

The secondary valve actuating mechanism 7 embodies improved principles of design and construction and will now be described. As clearly illustrated in Figure 12 of the drawings it will be evident that the plate and valve actuating mechanism are preferably associated together to constitute a subassembly which may be readily detachably connected to the valve body 3 by the screws 52. As illustrated in this figure including Figures 10, 11, 14, 15 and 16, pivots 56 are permanently anchored to the plate and extend outwardly therefrom in transverse positions and pivotally support a pair of corresponding arms 57 and 58 for maintaining a cam member 59, rotatable on the shaft 16, in predetermined rotative positions in order that the fluid intended to circulate in certain of the passages will not be interrupted except at predetermined intervals. This cam member may be constructed as desired, but preferably is comprised of a pair of sheet metal parts 60 and 61 secured together by rivets 62 and 63, as shown in Figure 16. The central portions of these parts are arranged in spaced apart parallel relation and have aligned apertures therein which receive the shaft 16. The spacing of the central portions serves to prevent wobbling of the cam member on the shaft. Part 60 is provided with a pair of spaced marginal edges 64 and 65. Part 61 is provided with rearwardly extending walls to form generally V-shaped cams 66 and 67. If found desirable, these cams may be constructed in the form of pins. The upper ends of the rocker arms 57 and 58 are continuously yieldably urged into engagement with the cams 66 and 67 by a helical expansible spring 68 carried by lugs 69 on the lower ends of the arms. The upper end of the rocker arm 57 is provided with a notch 70, a rounded abutment 71, and an abutment 72 adjacent the pivot 56. The rocker arm 58 is similarly provided with a notch 73 and abutments 74 and 75.

An elongated oscillating member 76, carrying the secondary valve 5, is also rotatably mounted on the motor drive shaft 16 (see Figures 6 and 16). This oscillating member is provided with an upper head portion having a slot 77 therein which loosely receives the valve 5. The body of the valve is of hollow construction and includes a flange 78 which is disposed between the oscillating member and the planar base of the recess in order to prevent escape of the valve. This valve is operable to alternately place the center hole 37 in the boss in communication with first one and then the other of the apertures 47 and 50 as illustrated in Figure 30.

The oscillating member 76, as shown in Figures 14, 15 and 16, is provided with notches 79 and 80 adjacent the head portion and its other extremity or tail portion 81 is provided with a rubber bumper 82 in the form of a sleeve surrounding the tail. The tail is preferably notched as shown so that portions of the sleeve will recede into the notches to automatically lock the sleeve in place. The upper marginal ends of the cams 66 and 67 are adapted to alternately and periodically engage the notches 79 and 80 to flip the oscillating member. If found desirable, the construction may be modified so that the lower marginal ends of the cams will periodically engage the tail 81 at the same time that the upper ends of the cams engage the notches 79 and 80, or the lower ends may act to flip the oscillating member in lieu of the upper ends. The oscillating member is also provided with a central tubular portion 83 which finds support against the mounting plate. It will be noted that the tubular portion rides on the larger cylindrical portion of the shaft whereas the cam member 59 rides on a reduced cylindrical portion 84 and engages the shoulder 85 between the said cylindrical portions for predetermining the position of the cam member.

The adjustable dialing or arc control means on the motor whereby any required rotational range or movement of the motor shaft may be obtained is unique in character and will now be described. A round guide plate 86 rotates with the shaft 16 by reason of an oblong center opening 87 in the plate which receives the reduced oblong end 88 of the shaft. The periphery of this plate is preferably interrupted by a pair of diametrically opposed corresponding slots 89 which are arranged in alignment with the oblong opening 87. A metal washer 90 may be mounted on the shaft between the cam member 59 and the guide plate 86 in order to assist in reducing friction therebetween.

A substantially round driver 91, as exemplified in Figures 14 and 16, is provided adjacent its periphery with a pair of rearwardly extending diametrically opposed fingers 92 and 93 which are preferably of sufficient length so that finger 92 will project into but not entirely through the upper slot 89 in the guide plate 86, and so that finger 93 will extend through the lower slot to a position between the spaced marginal edges 64 and 65 on the cam member 59. This driver is further provided with a curved slot 94 defined by an upper marginal edge 95 and a lower arcuate marginal edge 96, the ends of the slot terminating at points 97.

A generally rectangular cover or shield 98, as shown in Figures 6, 9, 17, 18, 19 and 20, is adapted to be secured over the secondary valve actuating mechanism 7 by a pair of screws 99 which extend through the cover and engage threaded apertures provided in the outer ends of the special screws 52. One end of an elongated spring 100 is secured to the inner side of the cover by a rivet 101 and its remaining portion 102 extends angularly toward the driver 91. When the cover is secured in place, the portion 102 will bear against the driver 91 and cause its inner face to engage the oblong end portion 88 of the drive shaft and thereby maintain components of the secondary valve actuating mechanism in predetermined assembled positions with respect to each other and with respect to the drive shaft 16 and the mounting plate 11. In other words, when the cover 98 is detached, the majority of the parts of the actuating mechanism may be readily removed.

Movement of the driver to obtain a desired range of rotational movement of the motor shaft may be accomplished in various ways, but as herein illustrated, its movement is preferably controlled by a manually operable knob 103 secured to the cover 98 by the rivet 101. As shown in Figures 6, 17, 18 and 19, the rivet 101 also extends through a heart-shaped cam 104 anchored for rotation with the knob, a cam follower 105, and a resilient member 106, all of which are interposed between the front wall of the cover and the front wall of the knob. The resilient member 106 is located between the cover and follower and functions to produce sufficient friction to maintain the parts in position after they have been adjusted and at the same time serves to hold the follower in proper relationship to the cam.

The follower 105 is provided with a generally square-shaped opening 107 which receives the cam 104. The upper and lower margins of the opening 107 are provided with re-entrant portions 108 which are adapted to respectively engage the generally V-shaped cam surface 109 located relatively close to the rivet 101 and the oppositely disposed curved surfaces 110 on the cam. This follower is also provided with an upper lug 111 and a lower lug 112. These lugs are oppositely disposed and of a length to project through longitudinally extending slots 113 in resilient member 106 as well as through corresponding slots 114 formed in the front wall of the cover 98. As clearly exemplified in Figures 6, 15 and 16, it will be noted that the upper lug 111 also projects through a slot 115 in the elongated spring 100 and through curved slot 94 provided in the lower part of the driver 91. With this unique arrangement, it will be evident that the driver 91 is limited to a movement in a plane parallel to the guide plate 86 and transverse to the longitudinal axis of the motor shaft, this being due to the fact that the fingers 92 and 93 of the driver are received in the slots 89 of the plate 86, and since the driver 91 and plate 86 are interconnected and the plate 86 is keyed to the shaft, the driver and plate will both rotate with the shaft. It will also be apparent that the cam follower 105 is limited for movement in a plane corresponding to that of the guide plate whenever the knob 103 is rotated for the purpose of obtaining a desired arc or range of rotational movement of the drive shaft. The operation of this arc control device will be explained in greater detail subsequently.

The primary valve 4, as shown in Figures 2 through 6, may be constructed in various ways but as herein illustrated in Figures 8, 29 and 30, is preferably made round and of neoprene or some other desirable resilient material that will tend to automatically adjust and seat itself with respect to its recessed seat 26. The valve lever 28, therefore, includes a round flat portion 116 which is interlocked with the valve and includes an offset tab 117, the latter being provided wtih an opening which receives the inner end of a flexible wire 118 constituting a component of the hand control unit 6. A disc-like cover 119 overlies the valve 4 and engages the angular flange 27 formed on the valve body and a pivot screw 120 extends through this cover, lever and valve into a threaded aperture in the body for holding the parts in assembly. The interlock between the lever and the primary valve, as illustrated in Figure 32, is preferably accomplished by providing the upper side of the valve with an elevated round central portion 121 having diametrically disposed radial portions 122 and 123 and corresponding arcuate elevated portions 124, all of which portions are snugly received in openings in the lever, which openings have shapes corresponding to such portions.

As further exemplified in Figures 29, 30 and 31, the throttle valve 4 is also provided with a tubular center core portion 125 at its underside with an annular recess 126 surrounding the core. When the motor is in an operating condition as exemplified in Figures 29 and 30, passages 29 leading to the vacuum supply and passage 35 leading to the secondary valve 5 will be placed in communication with the annular recess 126 through vertical passage 30 and port 36, respectively. The valve 4 is further provided with a pair of separate corresponding arcuate recesses 127 and 128 disposed substantially concentric to the annular recess. Attention is directed to the fact that the annular recess 126 is provided with a diametrically disposed connecting recesses 129 and 130 which will be described more in detail subsequently. The annular recess is at all times in communication with the passages 29 leading to the vacuum supply. It will be noted that these recesses on the underside of the valve substantially correspond in shape and size with the raised or elevated portions provided on its upper side.

The cover 2, as shown in Figures 2 and 27, is provided with a pair of standards 131 and 132 which are joined with the raised portion of the cover which forms the substantially cylindrical chamber 24 and longitudinally extending elevated rib portions 133 within which the longitudinal passages 39 and 42 are located. The inner extremity of the flexible control unit 6 may be connected to either standard depending on the installation requirements. It will be noted that the offset tab 117 on primary valve lever 28 is located for movement in the space between the standards. Rotational movement of the valve 4 may be limited in a number of ways but as herein illustrated the annular flange 27 about the recess 26 is preferably notched as indicated at 134 in Figures 3 and 24 so that the ends of the notch provide abutments which may be engaged by the lever. The upper end of each standard is provided with a recess 135 and a threaded aperture. A metal sleeve 136, as shown in Figures 2 and 29, is swaged or otherwise secured to a conventional tubular guide 137 for the flexible wire 118. A reduced portion or neck of the sleeve 136 is adapted to be received in a recess and detachably secured therein by screw 138. The inner end of the flexible wire 118 may be attached to the tab 117 of the primary valve lever 28 in any manner desired but as herein illustrated, such end is provided with an angular offset 139 which is so constructed and arranged that it may be easily and quickly inserted into a hole provided therefor in the tab 117. The arrangement is such that when the sleeve 136 is anchored against movement to a standard the inner end of the wire 118 will remain connected there with the tab 117. In other words, when the sleeve is removed from the standard the inner end of the wire may be withdrawn from the hole in the tab 117. With this novel construction the hand control unit 6 may be easily and quickly connected with either of the standards. The guide 137 as shown is enclosed within a tube 140 of insulating material for the purpose of preventing the metal guide from accidently engaging any electrical conductors or terminals housed under the instrument panel.

Novel means are also provided whereby the outer extremity of the flexible control unit can be readily installed, for example on the instrument panel of a motor vehicle as shown in Figures 1 and 2. Such means includes an exteriorly threaded member 141 having a longitudinal bore 142 therein slidably receiving a plunger 143. The outer end of the conventional flexible guide 137 is preferably anchored in a continuation 144 of member 141 by swaging as indicated at 145. The inner end of the plunger has a socket formation which embraces the enlarged round end 146 of the flexible wire 118 to provide a swivel connection therebetween. A sleeve 147 is secured to the outer end of the plunger by a set screw 148 and a knob 149 is secured about the sleeve by said screw. Member 141 is preferably provided with flat sides (not shown) which engage margins of an opening 150 provided in a panel 151 to prevent rotation of the member. Nuts 152 may be employed to secure the member in place. It will thus be apparent that the outer extremity of the control unit can be readily installed by merely drilling a hole in the panel and then securing the components of such extremity to the panel.

The operation of the motor and parking features thereof are comparatively simple and will now be described. As stated above, the annular recess 126 formed in the under side of the throttle valve 4 is at all times in communication with the vacuum means. When the throttle valve 4, secondary valve 5 and the various components of the mechanism 7, including the vane 15 are in the positions illustrated in Figures 4 and 31, the motor shaft will be held against movement to prevent operation of a wiper arm and blade, this being due to the fact that the recess 126 is not connected to center hole 37 through passage 35. When the secondary valve is carried over to the position illustrated in these two figures, the passages 42, 48, 35 and 45 will be vented to the atmosphere through the aperture 47 in boss 53 so that one side of the vane is subjected to the vacuum through port 41. More specifically, when the throttle valve 4 is in such position, the recess 126 will be placed in communication with the port 40 which connects with port 41 through passage 39, all of which will cause a seal 153 on one side of the vane to be drawn intimately against a truncated tubular formation 154 and thereby maintain the motor shaft 16, and a wiper arm and blade operatively connected thereto, in a parked position until the valve 4 is moved to place recess 126 in communication with port 36, as illustrated in Figures 29 and 30, in which event the secondary valve 5 will be caused to oscillate and connect ports and passages to actuate the vane. The truncated formation 154, as shown in Figure 4, is an integral portion of the cover and surrounds the port 41. A similar formation 155 surrounds the port 44. The seal 153 is yieldably supported on the vane and serves to prevent seepage of air from the raceway or chamber into the port 41 and at the same time acts to cushion the parking stroke of the vane. A similar seal 156 is carried by the opposite side of the vane for cooperation with the formation 155 to park a wiper arm when the control unit 6 is attached to the standard 132.

Moreover, it will be noted that when the vane is in the parked position as above described and illustrated in Figure 4, various components of the secondary valve actuating mechanism 7 will assume predetermined positions. When the vane is in this particular parked position, cam 67 of member 59 will be caught in the notch 73 of rocker arm 58 and cam 66 will be caught between notch 79 on the head portion of oscillating member 76 and the abutment 71 on the upper end of the rocker arm 57, and the rubber bumper 82 on the tail portion of the oscillating member will engage the abutment 72 on arm 57. Attention is directed to the fact that whenever the requirements of a particular installation call for hooking the control unit to standard 132 in lieu of standard 131, the components will take positions substantially opposite to those just referred to. More specifically in this regard, it will be apparent that whenever the valve 4 is moved to place the recess 126 in a position opposite to that illustrated in Figure 31 the radial recess 130 of recess 126 will be located between ports 36 and 46 in the valve body and the seal 156 on the vane will be drawn against the other truncated formation 155 to close the port 44 of passage 42. When so parked, the aperture 50 will be exposed to the atmosphere and passage 42 connecting ports 43 and 44 will be placed in communication with the vacuum through recess 126 which is at all times connected to such vacuum through a passage 29. Also the cam member 59 and oscillating member 76 will assume reverse positions with the cam 66 being located in notch 70 of rocker arm 57, cam 67 caught between abutment 74 on rocker arm 58 and notch 80 of member 76, and bumper 82 on the oscillating member will bear against abutment 75 on rocker arm 58. This rubber bumper serves to eliminate noise when the motor is being operated.

To operate the motor, the throttle valve 4 is rotated to the position illustrated in Figures 29 and 30 by the flexible member 118 to connect the annular recess 126, which is at all times in communication with the vacuum, with port 36 through radial recess 130, port 36 leading to hole 37 through passage 35, thereby connecting hole 37 and aperture 50 through valve 5 when the valve is in the dotted line position in Figure 30. Aperture 50 will also be connected with port 49 through passageway 48, port 49 to port 43 through arcuate recess 128, and port 43 to port 44 through passageway 42, to establish a through line of communication from passage 29 to secondary valve 5 and port 44 to cause the vane 15, previously located in the parked full line position in Figure 4, to be pulled to the left, as exemplified by the dotted lines in Figure 4. The moment the secondary valve 5 is flipped from aperture 50 by the actuating mechanism 7 to cover aperture 47, communication will be established between port 41 and port 40 through passageway 39, port 40 to port 46 through arcuate recess 127, port 46 to aperture 47 through passageway 45, aperture 47 to hole 37 through valve 5, hole 37 to port 36 through passageway 35, and port 36 to a passage 29 and the vacuum through annular recess 126 to cause the vane to move back to the right as exemplified in Figure 5. This oscillating movement of the vane will of course continue until the valve 4 is rotated to a parked position. Attention is directed to the fact that since the secondary valve 5 is in communication with the vacuum, it will be drawn toward the boss 53 and its flange 78 will act as a seal as it slides over the outer face of the boss. It is of course to be understood, that when the valve 4 is in the operating position just referred to, the shaft will be oscillating at its maximum speed. To reduce the rate of oscillation, it is merely necessary to move the valve 4 in a direction to reduce the volume of the suction at the ports 41 and 44. The radial recess 129 communicating with the annular recess 126 is so located that the passage of air between recess 126 and either of the ports 40 and 43 leading to passages 39 and 42 may be easily regulated, and so that the wiper arm and blade assembly may be eased or slowly moved to the desired parking position.

As briefly described above, the driver 91 movable with the shaft 16 serves to oscillate the cam member 59 relative to the shaft and when the cam member reaches a predetermined position, the spring 68 under compression will cause the rocker arms to snap the cam member against the oscillating member 76 which carried the secondary valve 5. More particularly, the guide plate 86 is keyed to the shaft 16 and the driver 91 to the plate by means of the fingers 92 and 93 extending through the slots 89. Since the driver moves with the shaft the finger 93 on the driver will alternately engage the spaced abutments 64 and 65 on the cam member when the motor is in operation. Assuming that the oscillating member 76 has been flipped to place the secondary valve in the position illustrated in Figure 10 to cause the vane to be pulled toward the left, the cams 66 and 67 on member 59 will be located as shown in Figure 12. As the shaft 16, guide plate 86, driver 91 and vane 15 rotate clockwise, the oscillating member 76 and cam member 59 will remain stationary until the lower finger 93 on the driver 91 engages the abutment 64 on the cam member, whereupon the cam member will be rotated along with the driver causing the cam 66 to move out of the notch 70 in the rocker arm 57 and cam 67 to act against abutment 74 on arm 58. This movement of the cam member 59 causes the upper extremities of the rocker arms to spread apart or diverge and compress the spring 68 as viewed in Figure 15, and the instant the cams ride over the abutments 71 and 74 and beyond center, the arms will snap the cam 66 on member 59 against the notch 79 on the oscillating member 76 to cause the latter to flip over so that the secondary valve 5 will cover hole 37 and aperture 50 as shown by the dotted lines in Figure 30, after which the vacuum will cause the vane to be moved back to the right in a counter-clockwise direction. When the hole 37 and aperture 50 are so covered, the cam 67 will be seated in notch 73 of rocker arm 58 and cam 66 against the abutment 71 on arm 57 and rubber bumper 82 against abutment 72 on arm 57. As the shaft 16, driver 91, guide plate 86 and vane 15 travel in the counter-clockwise direction just stated, the oscillating member 76 and cam member 59 will remain stationary until the finger 93 on the driver engages the abutment 65 on member 59 whereupon the member will be rotated along with the driver causing the cams 66 and 67 to urge the upper extremities of the rocker arms 57 and 58 outwardly to again compress the spring 68 and the instant the cam member 59 is moved past center, it will be thrown to snap cam 67 against the notch 80 of the oscillating member 76 to flip the latter back to a position where secondary valve 5 will again cover hole 37 and aperture 47.

If found desirable, the parts could be so designed and constructed that the upper finger 92 on the driver would engage an upper marginal edge on the cam member at the same time that finger 93 engages either of the abutments 64 and 65, or the arrangement may be such that the upper finger 92 will alternately engage upper marginal edges of the cam part 60 in lieu of the finger 93 engaging abutments 64 and 65.

As stated above, one of the important objects of the invention is to provide a unique arrangement whereby the range of rotational movement of the shaft and vane may be varied, within practicable limits, to meet different installation requirements. Thus, one motor equipped with the manual control of the subject invention exemplified in Figures 6, 15 and 18 through 24 may be installed in any one of a considerable number of different types, makes or models of automotive vehicles. With such a motor, the replacement setup is improved as described at the beginning of this specification. This manual arc control or dialing device 8 is operable independently of the flexible control 6 and as pointed out above is preferably primarily carried by the cover 98 shielding the secondary valve actuating mechanism 7.

This dial device may be operated by merely manipulating the knob 103. When, for example, a particular installation requires that the motor shaft oscillate within the maximum range of 120 degrees, the knob will be rotated so that a number 9 thereon will register with an arrow 157 on the cover 98 illustrated in Figure 18, in which position the lower finger 93 on the driver will be located as shown in Figures 10, 11 and 14, and the upper lug 111 on the actuating element 105 will be arranged adjacent to the lower marginal arcuate edge 96 of the curved slot 94 in the driver as shown in Figures 21 and 22. If, for example, the installation requires a minimum range of 80 degrees, the knob will be turned to place the number 1 on the knob opposite arrow 157 as illustrated in Figure 20, whereupon finger 93 on the driver 91 will be located a closer radial distance to the axis of the shaft 16 and consequently, such finger will alternately engage the outer extremities of the abutments 64 and 65 to cause the driver, guide plate and vane to travel a shorter rotational distance than when the control is set for a maximum range. This difference in rotational ranges is due to the fact that the driver is adjustable with respect to the cam member so that the finger 93 may, within practicable limits, be moved to any one of a number of infinite radial distances from the shaft axis to obtain a rotational range within 80 to 120 degrees as illustrated. It will be noted that the faces of the abutments 64 and 65 are arranged at an angle with reference to a line passing through the fingers 92 and 93 on the device so that the lower finger 93 will travel a longer circumferential distance to engage the abutments when located farther away from the shaft axis as shown in Figure 21 than when closer as depicted in Figure 24. Obviously, the components employed to obtain the rotational ranges just referred to may be modified to obtain a range less than 80 degrees or in excess of 120 degrees, and indicia other than the numbers on the knob 103 and arrow 157 on the cover 98 may be used.

When the installation requires that the motor should function to rotate its shaft and a wiper arm operatively connected thereto within a range less than the maximum, the knob will be rotated so that the upper lug 111 on the actuating element or follower 105 will forcibly engage the upper marginal edge 93 of the curved slot 94 provided in the driver 91 to move the finger 93 on the driver radially inward whereby the finger may alternately engage the abutments 64 and 65 on the cam member 59. Rotation of the knob to the position shown in Figure 18 will place the V cam surface 109 of the cam 104 in engagement with the upper reentrant portion 108 of follower 105 and rotation of the knob to the position in Figure 21 will place the lower reentrant portion 108 in contact with said cam surface 109. This cam 104 transmits a uniform motion to the follower by causing the cam surfaces 109 and 110 in the cam to engage the reentrant portions 108. The opening 101 in the follower is of a size to provide clearance for movement of the cam in substantially the right half of the opening whereas the left margin 158 depriving such opening serves as a stop for limiting the rotational movement of the cam and knob. As pointed out above, the upper and lower marginal edges 97 and 96 of the curved slot 94 are of a different character and as a consequence, the marginal edges are located closer together at a point substantially in alignment with the fingers 92 and 93 and straight slot 87. Accordingly, the space between the marginal edges at such point is of a size to accommodate the upper lug 111 of the follower in order to hold the cam member and follower assembled to obtain proper mechanical adjustment and movement therebetween. This manual control assembly has proven satisfactory in use and provides means whereby the rotational range of movement of the vane may be readily varied before or while the motor is in operation although in the majority of installations the control will be set for a predetermined range prior to installation. This manual control is entirely independently operable of the control unit 6.

It is to be understood that the scale or dial may be omitted and the adjustment may be made after the motor is installed, connected and ready for service—in which event the positions of the windshield wiper blade with relation to the windshield frame determine visually what the adjustment should be.

It will be noted that as wear, stretch or other abormal conditions in the transmission mechanism between the motor and the windshield wiper blade develop so as to create "slap" permitting the wiper arm and/or blade to slap the windshield wiper frame objectionably when the wiper is in operation, this control may be adjusted to shorten the rotational arc of the wiper blade to prevent such "slap." This is a rather prevalent condition affecting certain original types of installation.

As pointed out above at the beginning of the subject specification, one of the primary objects of the invention is to provide a motor with a novel crank assembly whereby the crank assembly may be operatively connected with different types of linkages which are installed as original equipment. This crank assembly is operatively connected with the arc control or dialing device 8 in a manner whereby the rotational range of the assembly may be varied as desired so that it may be hooked up with any one of numerous types of linkages.

The crank assembly, as exemplified in Figures 25, 26 and 27, includes a supporting member 159, a plate member 160, a pair of corresponding relatively adjustable cranks 161 and 162 having inner portions disposed between the members, and screws 163 and 164 for securing the cranks to the supporting member. This supporting member is made preferably round and is recessed to provide a bottom wall and an annular flat border flange 165 which are joined by an inclined wall 166, the bottom wall and flange being arranged substantially parallel. The outer flat surface of the border flange 165 is preferably provided with suitable indicia such as spaced lettered graduations for locating one crank and numerated graduations for the other crank. The bottom wall is formed with a round boss 167 having an inclined wall 168 which merges with the bottom wall. This boss is provided with an oblong hole 169 which receives the reduced oblong portion 170 of the shaft 16 and the end of the shaft is upset to preferably permanently anchor the supporting member for rotation with the shaft. The bottom wall is also provided with a pair of diametrically disposed threaded apertures which receive the shanks of the screws 163 and 164. The inclined walls 166 and 168 in combination with a portion of the bottom wall define an annular track having a predetermined width.

The cranks are preferably substantially identical in character and each includes an inner arcuate flat base portion 171 which bears against the bottom wall of the track and an outer radial arm 172. Each crank is also provided with an arcuate inclined flange 173 which merges with the arm and each flange has a pointer 174 at one side of the arm. The base portion of each crank is also provided with an arcuate slot 175 and arcuate notch 176. The threaded shanks of the screws 163 and 164 extend through holes provided therefor in the plate member 160, through the arcuate slots 175 in the inner portions of the cranks and into the threaded apertures provided in the supporting member 159. The central portion of the plate member 160 is preferably provided with a boss 177 for the purpose of providing clearance for the upset end of the shaft 16. The width of the base portion of each crank is preferably predetermined in a manner similar to that of the track so that when the cranks are properly located and secured in place by the plate 160 and screws 163 and 164 on the supporting member, the inclined flanges 173 on the cranks will be caused to forcibly engage the inclined wall 166 on the supporting member and the marginal edge defining the notch 176 the crank will receive the boss portion 177 and forcibly engage the inclined wall 168 thereof. The screws 163 and 164 are preferably of the binding head type and thereby assist in locking the cranks in place.

The radial arm 172 of each crank is provided with an aperture which receives the end of a cylindrical crank pin 178, the inner end of each pin being preferably upset to permanently anchor the pins with their axis arranged parallel to the longitudinal axis of the motor shaft 16. The free end of each pin is preferably formed with an annular groove to provide a neck portion 179. As shown in Figure 28 the inner extremities of bars 180 of a linkage assembly are operatively connected with wiper arm shafts and provided with holes which rotatably receive the crank pins 178. Retaining means comprising a pair of holding members 181 joined by a spring 182 serve to detachably secure the boss to the pins. Each holding member is provided with a key-hole slot which includes an entrance opening 183 of a size to permit the member to be telescoped over a pin and an opening 184 of a size to accommodate the neck portion 179.

With this novel arrangement all of the components of the crank assembly will at all times be operatively connected together so that by merely loosening the screws 163 and 164 the cranks may be moved to any desired rotative position and then locked in place by tightening the screws. More specifically in this respect, when the screws are loosened, the crank 161 may be moved to a given predetermined rotative position by locating its pointer 174 in registry with a graduation A so that a bar 180 adapted to be connected to its crank pin will transmit the desired range of oscillating movement to the wiper arm and blade adapted to be actuated by such bar through the drive shaft subject to the setting of the arc control device 8. The crank 162 may be similarly moved to a predetermined position by registering its pointer with a graduation bearing a numeral 6, so that the crank pin thereon will be properly located for connection with the other bar 180 similarly operatively connected to a different wiper arm and blade assembly. In other words, the construction and arrangement is such that by using an appropriate chart, one may determine in advance the proper relative positions the cranks should take for connection with any type of linkage assembly. It will thus be apparent that this unique crank assembly is operatively connected with the arc control device in such a manner that the oscillating range movement of the wiper arm and blade assembly may be varied as desired by manipulating the device through the intermediation of the crank assembly.

As alluded to above, one important object of the invention is to provide a motor having improved means for maintaining the mounting plate 11 carrying the secondary valve actuating mechanism in a predetermined position. In the die-casting of certain metals it is sometimes difficult to maintain accurate dimensions of the moulded parts. For example, when the housing 1 of the motor above described is die-cast variations in the overall thickness will occasionally occur so that the distance between the inner surface of the mounting plate and the adjacent outer surface of the housing will vary. In order to compensate for variable dimensions and maintain the mounting plate in a predetermined fixed position so that the inner edges of the cover 98 will bear intimately against a gasket 183, the rear-side of the mounting plate is preferably provided with an elongated leaf spring 184. This spring is secured intermediate its ends by a rivet 185 to an offset portion 186 formed in the lower extremity of the mounting plate and is provided with a pair of finger portions 187 which resiliently bear against the adjacent outer surface of the motor housing. It will be noted, in Figure 6, that the upper extremity of the mounting plate 11 is secured within the recess 51 by the screws 52 and that its lower extremity would be unsupported except for the leaf spring. This spring in some measure prevents distortion of the mounting plate. Since the mounting plate is provided with a border flange, this spring is substantially concealed from view. It will be noted that this offset serves the dual purpose of providing clearance for the helical spring 68 and a support for the leaf spring 184.

As also pointed out at the beginning of the specification one of the objects of the invention is to provide an improved filter sub-assembly which serves to cleanse all air that is admitted to either of the apertures 47 and 50 which are communicatively connected with the chamber on opposite sides of the vane 15. This filter assembly as illustrated particularly in Figures 18, 19 and 20 of the drawings includes a generally oval receptacle 188 having a base wall provided with a pair of holes which are aligned with corresponding holes in the bottom wall flanged 189 of the cover 98. Tubular rivets 190 project through these holes and are upset to permanently anchor the receptacle to the cover. A generally rectangular piece of fibrous filter material 191, such as felt, is arranged in the receptacle and detachably secured therein by a cover 192. This cover is provided with a pair of resilient side walls 193 which embrace the side walls of the receptacle and have slightly in-turned portions 194 which bear against curved portions of the receptacle as clearly shown in Figure 19 whereby to assist in holding the cover in place.

The construction is preferably such that the cover may be slid lengthwise over either end of the receptacle to place the bottom wall 195 of the cover over the felt so that air will be admitted to the filter material 191 through a plurality of apertures or ports 196, provided in said wall. A comparitively fine mesh screen 197 is preferably interposed between the filter material and the bottom wall of the cover to space the filter material a slight distance inwardly from the ports 196 and thereby permit a greater distribution of air across and into the outer face of the material. With this arrangement dust or foreign matter will tend to collect on the screen and protect the filter material from becoming clogged particularly at the ports. It also serves to dampen any noise due to the sucking of air into the filter material through such ports. With this unique arrangement, it will be evident that all air that is introduced into the compartment for the secondary valve actuating mechanism and into the motor chamber through apertures 47 and 50 will be filtered.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described and defined in the claims.

I claim:

1. An oscillating fluid motor assembly comprising a housing provided with a chamber, a piston operable in said chamber, passageways in said housing communicating with said chamber, a shaft mounted on said housing and oscillated by said piston, a reversible valve disposed adjacent said shaft and slidably disposed over said passageways, a cam member rotatably mounted on said shaft and having diametrical opposed cam faces, said cam member being adapted to actuate said valve, a driver movable with said shaft and adapted to actuate said cam member, rockers pivotally disposed on opposite sides of the cam member and adapted to engage the respective cam faces of said cam member, resilient means associated with said rockers whereby to urge portions of said rockers toward said cam member, a supporting member carried by the shaft, crank arms provided with crank pins spaced from the shaft axis, means for connecting the arms to the supporting member, said connecting means, said supporting member and said crank arms being constructed and arranged in a manner whereby either crank arm may be adjusted to a desired position and then locked in place, a shield covering the cam member, and a control having a part extending outwardly from the shield so that it may engage the driver to cause the driver to actuate the cam member in a manner whereby the oscillating range of the crank pins about the shaft axis may be varied.

2. A fluid motor comprising a housing provided with a chamber, a shaft supported on the housing, a vane carried by the shaft and disposed in the chamber, automatic valve mechanism disposed to occupy either one of two operative positions for controlling movement of the vane, said automatic valve mechanism including an oscillating part and being operably responsive to the movement of said vane, a cam member movable to shift said oscillating part, cam pressure members mounted in opposed relation for movement with respect to said cam member, spring means surging said cam pressure members so that said cam is snapped ahead when beyond a predetermined position, a plate member fixed on the shaft, a pair of relatively movable cranks carried by the plate member and provided with drive pins spaced the same radial distance from the shaft axis, a support provided with an opening, an actuating part on one side of the support, a movable member engaging the actuating part, a knob member, a driver part arranged on the other side of the support, means extending from one of said parts through the opening cooperating with the other part, and means for maintaining the members and parts assembled with the support whereby manipulation of the knob member will cause the movable member to move the actuating part so that the extending means will operate the driver part whereby the travel of the drive pins may be varied as desired.

3. A fluid motor construction including a shaft, an element actuated by the shaft and movable between two predetermined parking positions, a supporting member anchored to said shaft for movement therewith, a crank arm adjustably mounted on said supporting member, an automatically reversible valve shiftable by said element to reverse the movement of said element, actuating means for said reversible valve, a manually controlled throttle valve movable to start said motor and control its speed and selectively to stop the motor at either parking position of the movable element, parking means operatively connected to said throttle valve in the stop positions of said throttle valve, the construction and arrangement of said movable element and said reversible valve and said throttle valve with respect to each other being such that when said throttle valve is selectively moved to either stop position said movable element is parked in said respective parking position, and means operatively connected to said actuating means for controlling its actuation in a manner to regulate the rotational range of the crank arm about the shaft axis and movement of the element between the parking positions.

4. A valve device for fluid motors, said device comprising a body provided with passageways terminating in ports, an oscillatable shaft mounted on the body, a valve pivotally mounted on the shaft for oscillatory movement for controlling the flow of fluid through the ports, means for arresting movement of the valve, adjustable actuating means mounted on the shaft adjacent one extremity thereof for oscillating the valve and for controlling the arc of oscillation of the shaft, resiliently connected rocker arms pivotally mounted on axes at opposite sides of and parallel to the axis of the shaft operably engaging said actuating means for accelerating the valve with a snap action, a support secured to the opposite extremity of the shaft, a crank adjustably connected to the support and provided with a pin having an axis disposed in spaced apart parallel relation to the axis of the shaft, and means for operatively engaging the actuating means for selecting and maintaining the arc of oscillation of the shaft, support and pin within a predetermined range.

5. An oscillating fluid motor assembly comprising a housing provided with a chamber, a piston operable in said chamber, passageways in said housing communicating with said chamber, a shaft mounted on said housing and oscillated by said piston, a reversible valve disposed adjacent one end of said shaft and slidably disposed over said passageways, a rotatable cam member having opposed cam faces, said cam member being adapted to actuate said valve, a driver movable with said shaft and adapted to actuate said cam member, rockers pivotally disposed on opposite sides of the cam member and adapted to engage the respective cam faces of said cam member, resilient means associated with said rockers whereby to urge portions of said rockers toward said cam member, a supporting member carried by the end of the shaft, crank arms adjustable on the supporting member, a support adjacent the cam member, and a control having a part extending through the support for operative connection with the driver to cause the driver to actuate the cam member in a manner whereby the oscillating range of the crank arms about the shaft axis may be varied.

6. A fluid motor comprising a housing provided with a chamber, a shaft supported on the housing, a vane carried by the shaft and disposed in the chamber, automatic valve mechanism disposed to occupy either one of two operative positions for controlling movement of the vane, said automatic valve mechanism including an oscillating part and being operably responsive to the movement of said vane, a cam member movable to shift said oscillating part, cam pressure members mounted in opposed relation for movement with respect to said cam member, spring means urging said cam pressure members so that said cam is snapped ahead when beyond a predetermined position, a member fixed on the shaft and a pair of cranks adjustably mounted on the member, a support provided with an opening, an actuating part on one side of the support, a movable member engaging the actuating part, a manual control member, a driver part arranged on the other side of the support, and means extending from one of said parts through the opening cooperation with the other part in a manner whereby manipulation of the control member will cause the movable member to move the actuating part so that the extending means will operate the driver part whereby the travel of the cranks may be varied as desired.

7. A valve device for fluid motors, said device comprising a body provided with passageways terminating in ports, an oscillatable shaft mounted on the body, a valve pivotally mounted on the shaft for oscillatory movement for controlling the flow of fluid through the ports, means for arresting movement of the valve, adjustable actuating means mounted on the shaft adjacent one extremity thereof for oscillating the valve and for controlling the arc of oscillation of the shaft, spring-urged means operably engaging said actuating means for accelerating the valve with a snap action, a support secured to the opposite extremity of the shaft, a crank adjustably connected to the support, and means for operatively engaging the actuating means for selecting and maintaining the arc of oscillation of the shaft, support and crank within a predetermined range.

8. A fluid motor comprising a chambered housing, a movable piston in said chamber, a shaft carrying said piston and having a portion extending exteriorly of the chamber, a support secured to the extending portion of the shaft, a crank adjustable on said support, a throttle valve and a secondary valve carried by the housing, mechanism spaced apart from the piston for operating the secondary valve, passages communicating with the chamber, said valves and said passages being constructed and arranged whereby when the throttle valve is connected to a vacuum and moved in one position, the piston and shaft will be caused to travel back and forth within a predetermined path in the chamber, means operative in conjunction with said mechanism for controlling the range of the travel of said piston, shaft, support and crank, and manually actuated means connected with said operative means for actuating the latter, said connection being independent of said shaft.

9. A fluid motor comprising a chambered housing, a movable piston in said chamber, a shaft connected to said piston and having ends extending exteriorly of the chamber, a throttle valve and a secondary valve carried by the housing, actuating means adjacent one end of the shaft for operating the secondary valve, a support secured to the other end of the shaft, a crank adjustable on the support, passages communicating with the chamber, said valves and said passages being constructed and arranged whereby when the throttle valve is connected to a vacuum and moved in one position, the piston will be caused to travel back and forth within a predetermined path in the chamber and when said throttle valve is moved to another position the piston will be caused to park beyond the normal operating path of the piston, a support located apart from the shaft and means extending through the support cooperable with the actuating means whereby the rotational movement of the shaft, support and crank may be varied.

10. A fluid wiper motor for a motor vehicle comprising a housing, a primary throttle valve carried by and communicating with the housing, a piston operable within a predetermined range in the housing, a shaft operatively connected to the piston and having a portion extending from the housing, a support secured to the extending portion of the shaft, a crank adjustable on said support and adapted for connection with a windshield wiper driving assembly, an enclosure carried by the housing, secondary valving mechanism disposed within the enclosure, said secondary valving mechanism including an element operatively associated with the shaft and including a valve for controlling fluid communication with the piston, means movable into operative association with the element whereby to alter the operating range of said shaft, piston, support and crank, and control means connected to said movable means and extending externally of the enclosure whereby to permit adjustment of said control means readily by the driver of the vehicle.

References Cited in the file of this patent

UNITED STATES PATENTS

| Number | Name | Date |
|---|---|---|
| 432,540 | Maurice | July 22, 1890 |
| 1,563,758 | Lindberg | Dec. 1, 1925 |
| 1,613,280 | Levett | Jan. 4, 1927 |
| 1,693,665 | Phillips, Jr. | Dec. 4, 1928 |
| 1,840,233 | Hueber | Jan. 5, 1932 |
| 1,853,758 | Brumm | Apr. 12, 1932 |
| 2,075,959 | Previti | Apr. 6, 1937 |
| 2,138,698 | Heaston | Nov. 29, 1938 |
| 2,141,720 | Marsh | Dec. 27, 1938 |
| 2,173,357 | Dall | Sept. 19, 1939 |
| 2,209,921 | Horton | July 30, 1940 |
| 2,260,853 | Hueber | Oct. 28, 1941 |
| 2,302,158 | Van Vulpen | Nov. 17, 1942 |
| 2,438,380 | Arens | Mar. 23, 1948 |
| 2,441,719 | Potter | May 18, 1948 |
| 2,483,150 | Olson | Sept. 27, 1949 |
| 2,602,430 | Bell | July 8, 1952 |

FOREIGN PATENTS

| Number | Country | Date |
|---|---|---|
| 697,976 | France | Nov. 5, 1930 |